(12) United States Patent
de Leon et al.

(10) Patent No.: US 8,201,092 B2
(45) Date of Patent: Jun. 12, 2012

(54) THEME CREATOR

(75) Inventors: David de Leon, Lund (SE); Staffan Hjort, Malmo (SE); Simon Winter, Vaxjo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 756 days.

(21) Appl. No.: 12/083,512

(22) PCT Filed: Oct. 12, 2006

(86) PCT No.: PCT/EP2006/009875
§ 371 (c)(1),
(2), (4) Date: Mar. 18, 2009

(87) PCT Pub. No.: WO2007/042301
PCT Pub. Date: Apr. 19, 2007

(65) Prior Publication Data
US 2009/0327927 A1 Dec. 31, 2009

(30) Foreign Application Priority Data
Oct. 13, 2005 (EP) .................................... 05022332

(51) Int. Cl.
*G06F 3/00* (2006.01)
(52) U.S. Cl. .................... 715/732; 715/864; 715/866
(58) Field of Classification Search .................. 715/864, 715/866, 764, 732
See application file for complete search history.

(56) References Cited

U.S. PATENT DOCUMENTS

| | | | |
|---|---|---|---|
| 7,508,386 B2 * | 3/2009 | Kashio | 345/204 |
| 8,085,318 B2 * | 12/2011 | Ciudad et al. | 348/239 |
| 2002/0154142 A1 * | 10/2002 | Thomason | 345/629 |
| 2003/0043283 A1 | 3/2003 | Yamamoto | 348/231.3 |
| 2004/0002302 A1 * | 1/2004 | Takemoto et al. | 455/3.06 |
| 2005/0071771 A1 * | 3/2005 | Nagasawa et al. | 715/765 |
| 2005/0219384 A1 * | 10/2005 | Herberger et al. | 348/239 |
| 2006/0061654 A1 * | 3/2006 | McKay et al. | 348/143 |
| 2006/0077266 A1 * | 4/2006 | Nurmi | 348/239 |
| 2008/0059896 A1 * | 3/2008 | Anderson et al. | 715/764 |
| 2008/0215999 A1 * | 9/2008 | Kim et al. | 715/762 |

FOREIGN PATENT DOCUMENTS

| | | |
|---|---|---|
| EP | 1 513 330 | 3/2005 |
| JP | 10-42087 A | 2/1998 |
| JP | 2005-184109 A | 7/2005 |

OTHER PUBLICATIONS

"ACDSee 7.0 User Guide", *ACD Systems Ltd.* pp. I-iv and 78 (2004) (as cited in the International Preliminary Report on Patentability for the corresponding PCT/EP2006/009875 application).
International Preliminary Report on Patentability for PCT/EP2006/009875 dated Jan. 23, 2008.
International Search Report for PCT/EP2006/009875 dated Jan. 23, 2008.

* cited by examiner

*Primary Examiner* — Omar Abdul-Ali
(74) *Attorney, Agent, or Firm* — Myers Bigel Sibley & Sajovec, P.A.

(57) ABSTRACT

A theme creator includes an input unit for selecting and/or activating the theme creator, and a control unit configured to control the theme creator. The control unit is configured to receive image data transmitted by the camera when the theme creator has been selected and/or activated, and to change an appearance of the desktop and/or stand-by image depending on the image data from the camera and/or user input. A user may create his/her own theme such that a large number of preset themes and/or the use of an external theme editor could be avoided.

9 Claims, 4 Drawing Sheets

THEME CREATOR

CROSS-REFERENCE TO RELATED APPLICATIONS

The present application is a 35 U.S.C. §371 national phase application of International Application No. PCT/EP2006/009875 filed on Oct. 12, 2006, which claims priority from European Patent Application Serial No. 05022332.0 filed on Oct. 13, 2005, and from U.S. Provisional Application Ser. No. 60/728,795 filed on Oct. 20, 2005, the disclosures and contents of each of which are respectively incorporated by reference herein in their entireties. The above-referenced PCT International Application was published in the English language as International Publication No. WO 2007/042301.

TECHNICAL FIELD OF THE INVENTION

The present invention relates to the field of the appearance of the displays (themes) for portable electronic devices and to the provision of a theme creator in relation to portable electronic devices.

DESCRIPTION OF RELATED ART

Distinguishing the appearance of portable electronic devices, such as mobile phones, MP-3 players, PDAs etc has become an important need for many users. Often, users desire distinguished appearances, such as the appearance of the display, typically called a "theme", to meet their personal tastes and preferences instead of standard appearances.

In the following, the background of the invention is mainly related to a portable electronic device in the form of a mobile phone. However, this is not intended to limit the invention to such a particular device, it is only intended to better explain the object of the invention in an understandable way by a specific example of prior art.

Today, a typical manufacturer may be required to provide many different themes for a mobile phone model, each theme having a unique appearance. The task of managing such a demand has prompted the need for a new way to provide different themes for mobile phones to easily achieve a variety of distinguished appearances that meet the present and future market demand. This could be provided by delivery of mobile phones having a great number of preset themes, which may cause problems for instance as regards high development cost and problems with sufficient memory in the phone.

Because of that, for mobile phones, beside the user-selectable preset themes, there are also a number of so-called "theme editors" available for a user via the web or through PC-based applications by means of which the user thereof can edit a theme, for instance including a photo, provided for changing the appearance of the display of the mobile phone.

An example of a web-based editor or so-called "tool" is the Smart Themes Editor® provided by the manufacturer SonyEricsson. In this editor, basically the user uploads a photo to the web-application to be used as a so-called "stand-by" image. The user can then generate a theme by clicking a button, whereby suitable colours and background images are created based on the colours identified in the uploaded photo. Even if this solution is user-friendly, there may be improvements that can be made in terms of transfer possibilities to the mobile phone.

An example of a PC-based editor, or tool, is one also offered by SonyEricsson (though also many similar editors can be found for instance as shareware on the web). The tool lets the user have total control of all different parts of the GUI (Graphical User Interface) that may have a specific image or colour specified. Typically, a GUI for a mobile phone include many different user interface elements, together providing a particular appearance of the theme to a user. Examples of typical application areas for GUI:s are for instance in MP3 players and in the windows media player of a mobile phone. The PC-based tool has a number of advantages, but similar improvements as described in relation to the web-based tool may have to be implemented.

Nevertheless, no one of the above described methods (or other prior art) provide the possibility for a user to instantly create a theme by means of the portable electronic device itself only. All methods require some kind of external editor or tool, which may not always be present or easy to use.

Thus, there may be a need for a user being able to create a theme by means of the portable device itself, typically instantly.

SUMMARY OF THE INVENTION

The present invention is directed towards solving the problem to create a theme by means of the portable device itself.

One object of the present invention is thus to provide a theme editor that is provided by the portable device itself, and which makes it possible to create a theme without the use of an external editor.

According to a first aspect of the present invention, this object is achieved by a theme creator for a portable electronic device, said theme creator being arranged to provide a selectable graphical user interface (GUI) in the form of a user controllable theme, said theme creator comprising:
an input unit for selecting and/or activating the theme creator, a control unit arranged to control said theme creator, and arranged to receive image data, when the theme editor has been selected and/or activated, wherein the appearance of the graphical user interface (GUI) changes depending on the image data provided from the camera or already captured images, and wherein an image presentation device of the camera, such as a viewfinder, is arranged to present the appearance of the graphical user interface (GUI) in real time.

In this way, any part of the graphical user interface may be affected by the use of camera viewfinder information, or already captured images. A GUI for a mobile phone may include as many as hundreds such elements, which may typically be tailored by the use of bit-maps or by being colorized, without the need of an external editor.

A second aspect of the present invention is directed towards a theme creator including the features of the first aspect, wherein the graphical user interface (GUI) is arranged to be automatically updated and the appearance of the same changes when image data changes.

In this way, update and preview is instant and in real time. The user can see the end result before capturing the image and thereby creating the theme.

A third aspect of the present invention is directed towards a theme creator including the features of the first or second aspect, wherein the control unit is further arranged to control effects, filter colour schemes etc depending on user input manipulation.

A fourth aspect of the present invention is directed towards a theme creator including the features of any one of the previous aspects, wherein the control unit is arranged to freeze the graphical user interface (GUI) after having received image data from the camera comprising motion detection or timer manipulation.

A fifth aspect of the present invention is directed towards a theme creator including the features of any one of the previous aspects, wherein the control unit is arranged to freeze the graphical user interface (GUI) after having received image data from the camera comprising shutter button manipulation.

A sixth aspect of the present invention is directed towards a portable electronic device comprising:
a theme creator, said theme creator being arranged to provide a selectable graphical user interface (GUI) in the form of a user controllable theme, said theme creator comprising:
an input unit for selecting and/or activating the theme creator,
a control unit arranged to control said theme creator, and arranged to receive image data, when the theme creator has been selected and/or activated, wherein the appearance of the graphical user interface changes depending on the image data from the camera or already captured images and wherein an image presentation device of the camera, such as a viewfinder, is arranged to present the appearance of the graphical user interface (GUI) in real time.

An eight aspect of the present invention is directed towards a portable electronic device that includes the features of the seventh aspect, in which it is a cellular phone.

Another object of the present invention is to provide a method for creating a theme for a portable electronic device.

According to a ninth aspect of the present invention, this object is achieved by a a method of creating a theme for a portable electronic device, said method comprising the steps of:
providing a theme creator being arranged to provide a graphical user interface (GUI) in the form of a user controllable theme,
by means of an input unit selecting and/or activating the theme creator,
controlling said theme creator being arranged to receive image data transmitted by the camera or already captured images, when the theme creator has been selected and/or activated, wherein the appearance of the graphical user interface (GUI) desktop is changed depending on the image data.

The invention has the following advantages. By means of the invention, it is possible to instantly produce the look-and-feel of a theme. Moreover, it is also possible to use already captured and stored images and let them influence the GUI, such as the colouring of different items in the electronic device without the aid of external editors.

Moreover, no phone offers the user the option of creating a theme based on photos taken by the camera provided in the phone, thus restricting the number of selectable themes strongly. This is possible by means of the invention, according to this embodiment also providing the user the possibility to personalize his or her phone instantly.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable electronic device according to the present invention will now be described in relation to a mobile phone, which is a preferred variation of such an electronic device. The portable electronic device may be a portable electronic device of some other type, like a cordless phone, a communication module, a PDA, a digital camera or any other type of portable electronic device, communicating with or without radio waves.

Figure 5:
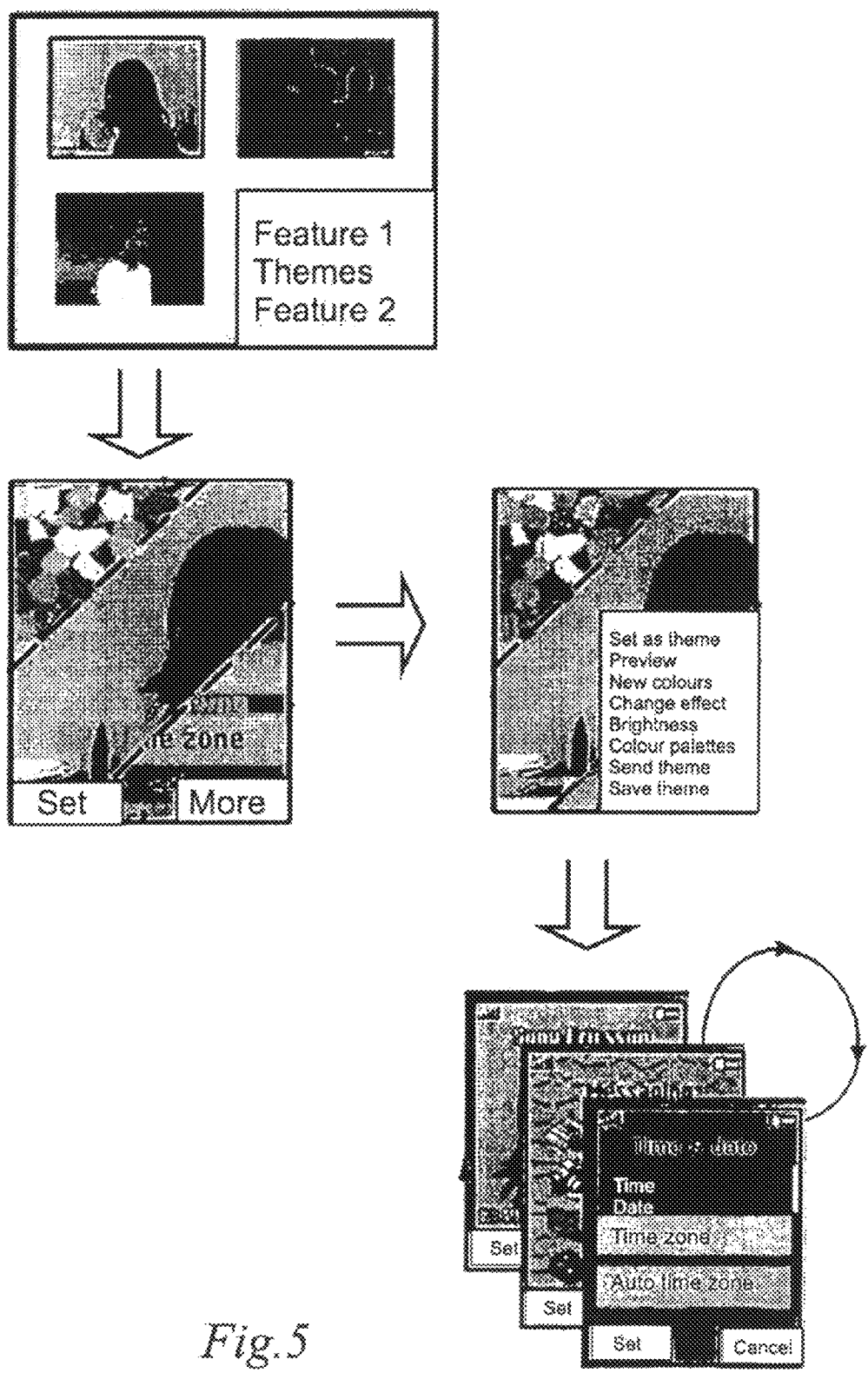
FIG. 5 shows how already stored images are used to create a theme.

In the following, three different application scenarios of the invention, scenario 1, scenario 2 and scenario 3 will be described. Scenario 1 is shown in FIG. 1a-e, scenario 2 is not shown in any drawing figure, and scenario 3 is shown in FIG. 5.

Figure 1A:
FIG. 1a-e schematically show the functioning of a theme creator according to a first embodiment of the invention, where the camera viewfinder is used to create a theme,
FIG. 2 schematically shows the first embodiment of the theme creator for the portable electronic device of FIG. 1a-c, herein schematically illustrated as a block schematic.
Figure 1B:
Figure 1C:
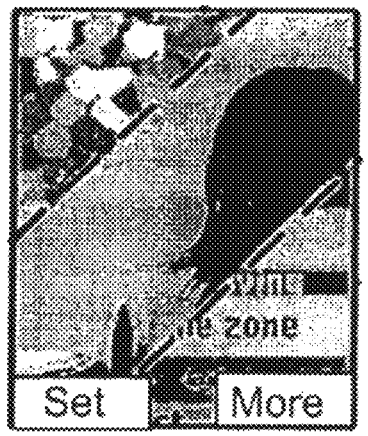
Figure 1D:
Figure 1E:
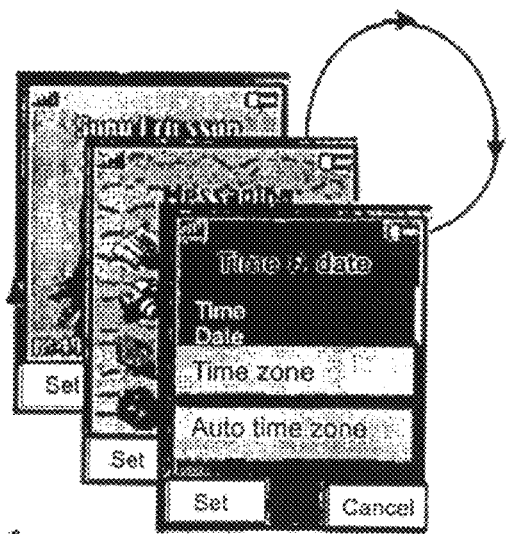
Figure 2:
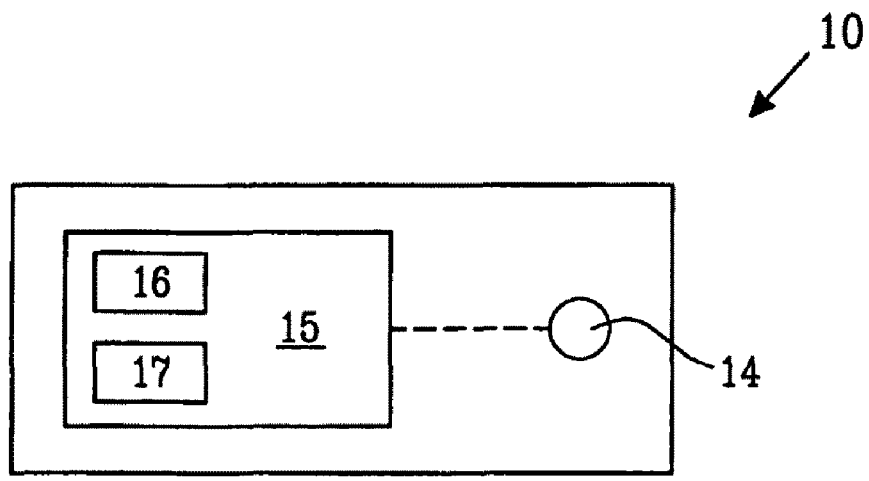
Figure 3A:
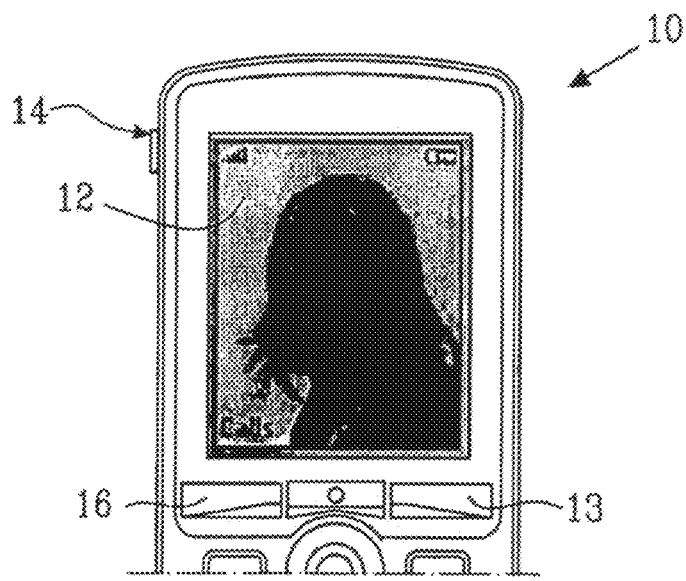
FIG. 3a-c schematically show a front view of a portable electronic device in the form of (a mobile phone, in which a user has set a theme in the form of a slide-show comprising a photo (taken by the camera of the phone), an icon display mode and a time/date mode, respectively, and
FIG. 4 schematically shows a flow chart of a method for creating a theme corresponding to the first embodiment of the invention.
Figure 3B:
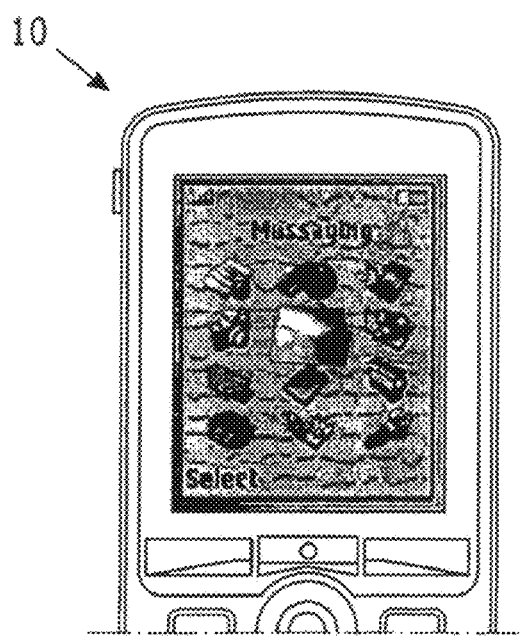
Figure 3C:
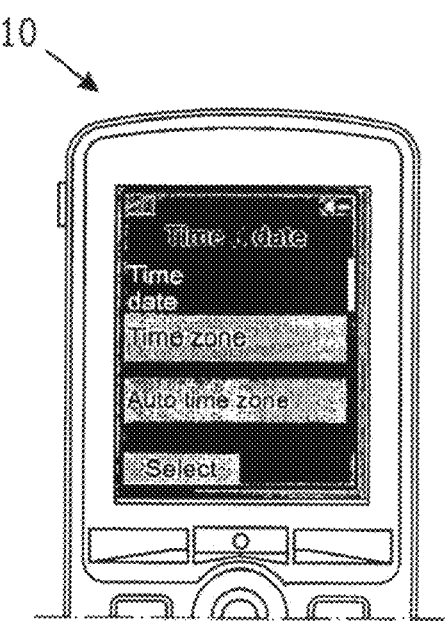

Now is referred to FIG. 1a-e, FIG. 2. and FIG. 3a-c.

FIG. 3a-c and FIG. 2 show a first embodiment of the present invention in the form of a phone 10 that includes a display 12, a keypad 13, and a camera 14, and a theme creator 15 communicating with an input unit, herein illustrated as a key 16 for selecting the theme creator 15, which key 16 will be used for the explanation of the present invention. As is customary, the keypad 13 includes several more keys, and the invention may be practised on some or all of them, instead of the special one 16 for selecting a theme editor. Moreover, the input unit (key 16) can be a so-called soft key or implemented in some other suitable way, provided a similar functioning as will be described below is fulfilled. For instance, it is possible to apply the teaching of the present invention also on other types of user input units like on navigation units like joysticks, and other types of buttons as well as on the display, which then may be a liquid crystal display, instead of the key 16.

FIG. 2 schematically shows a front view of the structure of the first embodiment of the mobile phone 10 including the theme creator 15 according to the invention. The theme creator 15 is arranged to receive image data transmitted by the camera 14, in this figure illustrated by a dashed line connecting the camera 14 (or received from another electronic device for instance) and a control unit 17 arranged to control said theme creator 15, and arranged to receive image data transmitted by the camera. The theme creator 15 has to be selected and/or activated in some way (theme creation mode entered) for the control unit 17 to receive image data. It is not necessary that the camera 14 transmits an image, but also stored images, previously created by the camera 14 could be selected instead (scenario 3). This variation will be described more below. For instance, the theme creator 15 is selected and/or activated by means of the user input unit 16 in dependence on manipulation by a user as described in the previous paragraph. For simplicity, flash memories or the like, though in practice required, are not illustrated since the function thereof is evident for a person skilled in the art, and since they are not explicitly connected to the invention.

Figure 4:
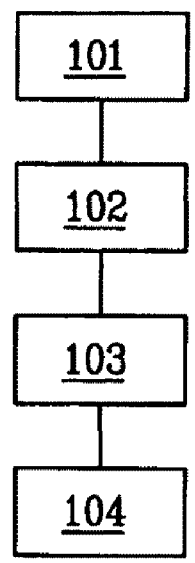

For a better understanding of the invention, a particular scenario, in which themes created by on the fly pictures taken by the camera, will be described step by step, primarily with reference to FIG. 3*a*-*c*, whereby reference also will be made to FIG. 4 illustrating a method according to an embodiment of the invention. A number of embodiments will be described to describe the wide-spread application of the invention, as well as thereto related advantages, starting with the first embodiment called "scenario 1", in which the basics of the invention, especially how the user will experience it will be described.

Scenario 1, Themes on the Fly Picture Taken by the Camera:

Basically, scenario 1 describes a situation in which the camera viewfinder information is used to create a theme, where one of the main features is to in real time get a preview of the end result, before capturing the picture. In even more detail, the scenario could be as follows:

1. The user starts the camera, and enters theme creating mode, step 101, FIG. 1*a*. Typically this is done by pressing the key 16, i.e. using the user input unit 16 to activate or enter theme creating mode as also disclosed above. This could be provided as schematically illustrated in FIG. 1*a* as selecting an item called "theme creator" from a pop up menu (in a way known per se) controlled by the control unit 17.
2. The user moves the camera around and the GUI, including for instance menu colours and desktop background image are automatically updated, as the colours in the camera's viewfinder (not shown) change, step 102, FIG. 3*b*. This is illustrated as three fields separated by dashed lines in FIG. 3*b*, showing preview mode including preview of desktop, stand-by and list. Also this is controlled by the control unit 17. Typically, far more items than desktop and stand by image as shown in FIG. 1*b* are affected. A particular example may include hundreds of items that may be affected, even if not shown in this figure.
    As an option, the user can set effects, filter colour schemes etc. Typically, this option can be implemented as a "more" item being selectable in a menu table (in a way known per se).
3. The user takes a shoot by pressing the shutter button (not shown), whereby the image freezes, step 103, FIG. 3*c* (freezed viewfinder).
4. The user sets the theme (the user has in the example also changed the background effect) having changed background desktop effect, step 104. This could be done for instance by selecting an item "set as theme" from a list of items (in a way known per se). Also controlled by the control unit 17.

FIG. 3*a*-*c* show yet another feature the invention may provide. In a slideshow for instance, the user may be able to see a better preview of the created theme as the theme would turn out if set as the phone theme. Thus, the invention is by no means limited to "time/date mode" as shown, since this is only intended to be an example of the type of user interface object (of the GUI) that could be affected by means of the invention.

Scenario 2, Use Viewfinder to Generate Colour:

The viewfinder information does not necessarily have to be included in the theme as stand-by image. It should be possible to enter a mode where the viewfinder is used only to find colour themes for the appearance of the GUI, and the picture itself is not used as part of the theme. This embodiment will make it much easier for the user to for instance create a greenish or pink style theme. Typically, the user in this mode will also use different surfaces such as clothing, desks etc, to find the colour match they are looking for.

Scenario 3, Already Stored Images are Used to Create a Theme:

1. As illustrated in FIG. 5, the user browses a data folder (having a plurality of images stored) and decides to create a theme.
2. The user creates a theme as described above.
3. The user sets the theme as described above.

The invention has a number of advantages. Since no cellular phone application for creating themes exists according to our present knowledge, it is today impossible to create a theme with the cellular phone as the only tool by means of a conventional phone, contrary to what is now offered by the present invention.

Moreover, no phone offers the user the option of creating a theme based on photos taken by the camera provided in the phone, thus restricting the number of selectable themes strongly. This is possible by means of the invention, according to this embodiment also providing the user the possibility to personalize his or her phone instantly.

Furthermore, current solutions available through the web or via PC based tools do not offer user the possibility to create good looking themes in a simple way, i.e. they are not always user-friendly. It might be hard to use the tools as they are sometimes advanced and require the user to define each and every object's colour etc. Thus, it might be difficult and time consuming to create a theme that looks good.

All known tools require the user to take a picture, transfer it to a PC, edit it in a tool, upload it to the phone (via bluetooth, PC-software, wap etc) and finally set it as a theme. Thus, typically a number of steps have to be made, which does not provide a user with the possibility to quickly create a theme from any picture stored or instantly taken with the camera.

In some cases, preset themes also require memory space and are costly to develop.

The invention, on the other hand, makes it very easy for the user to create his/her own theme such that a large number of preset themes could be avoided.

It is furthermore possible that one or more further images is/are to be superposed onto the first desktop image in order to modify it, for instance in order to provide a mystic or decorative effect.

Further advantages of the present invention is that it provides these effects without the use of external tools. It is furthermore simple and cheap to implement since a limited number of additional elements are needed. Typically, the invention could be provided as a software-solution in combination with already present input units and display(s).

The invention claimed is:

1. A theme creator for a portable electronic device, said theme creator being configured to provide a selectable graphical user interface (GUI) in the form of a user controllable theme, said theme creator comprising:
    an input unit for selecting and/or activating the theme creator; and
    a control unit configured to control said theme creator and configured to receive image data when the theme creator has been selected and/or activated,
    wherein the control unit is configured to change an appearance of the graphical user interface (GUI) depending on the image data provided from a camera and/or already captured images, and wherein an image presentation device of the camera is configured to present the appearance of the graphical user interface (GUI) in real time, and is configured to present the appearance of the graphical user interface (GUI) in a slideshow as a preview of the created theme, such that a user can see an end result before capturing the image and thereby creating the theme.

2. A theme creator according to claim 1, wherein the graphical user interface (GUI) is configured to be automatically updated, and wherein the control unit is configured to change the appearance of the GUI when image data changes.

3. A theme creator according to claim 1, wherein the control unit is further configured to control effects and/or filter colour schemes depending on user input.

4. A theme creator according to claim 1, wherein the control unit is configured to freeze the graphical user interface (GUI) after having received image data from the camera responsive to motion detection and/or timer manipulation.

5. A theme creator according to claim 1, wherein the control unit is configured to freeze the graphical user interface (GUI) after having received image data from the camera responsive to shutter button manipulation.

6. A theme creator according to claim 1, wherein the preview of the created theme includes updated menu colours and an updated background image.

7. A portable electronic device comprising:
a theme creator, said theme creator being configured to provide a selectable graphical user interface (GUI) in the form of a user controllable theme, said theme creator comprising:
an input unit for selecting and/or activating the theme creator;
a control unit configured to control said theme creator and configured to receive image data when the theme creator has been selected and/or activated,
wherein the control unit is configured to change an appearance of the graphical user interface depending on the image data from a camera and/or already captured images and wherein an image presentation device of the camera is configured to present the appearance of the graphical user interface (GUI) in real time, and is configured to present the appearance of the graphical user interface (GUI) in a slideshow as a preview of the created theme, such that a user can see an end result before capturing the image and thereby creating the theme.

8. A portable electronic device according to claim 7, wherein the device is a mobile phone.

9. A method of creating a theme for a portable electronic device, said method comprising:
providing a theme creator configured to provide a selectable graphical user interface (GUI) in the form of a user controllable theme;
by means of an input unit, selecting and/or activating the theme creator;
controlling said theme creator to receive image data transmitted by a camera and/or already captured images when the theme creator is selected and/or activated, and to change an appearance of the graphical user interface (GUI) depending on the image data from the camera and/or the already captured images; and
presenting said graphical user interface in real time by means of an image presentation device of the camera and presenting the appearance of the graphical user interface (GUI) in a slideshow as a preview of the created theme, such that a user can see an end result before capturing the image and thereby creating the theme.

* * * * *